United States Patent
Yang et al.

(10) Patent No.: US 10,250,142 B1
(45) Date of Patent: Apr. 2, 2019

(54) ADVANCED CONSTANT OFF-TIME CONTROL FOR FOUR-SWITCH BUCKBOOST CONVERTER

(71) Applicant: M3 Technology Inc., Taipei (TW)

(72) Inventors: Bo Yang, Allen, TX (US); Xiaoyu Xi, Dallas, TX (US); David Da Meng, Los Altos, CA (US)

(73) Assignee: M3 TECHNOLOGY INC., Taipei (TW)

(*) Notice: Subject to any disclaimer, the term of this patent is extended or adjusted under 35 U.S.C. 154(b) by 0 days.

(21) Appl. No.: 16/000,757

(22) Filed: Jun. 5, 2018

Related U.S. Application Data

(60) Provisional application No. 62/649,328, filed on Mar. 28, 2018.

(51) Int. Cl.
*H02M 3/157* (2006.01)
*H02M 3/158* (2006.01)

(52) U.S. Cl.
CPC ......... *H02M 3/1582* (2013.01); *H02M 3/157* (2013.01)

(58) Field of Classification Search
CPC .. H02M 3/1582; H02M 3/1584; H02M 3/156; H02M 3/1588
USPC .................................................. 323/282–285
See application file for complete search history.

(56) References Cited

U.S. PATENT DOCUMENTS

| | | | |
|---|---|---|---|
| 9,722,485 B2* | 8/2017 | Mikami | H02M 1/32 |
| 2011/0279098 A1* | 11/2011 | Ren | H02M 3/1582 323/234 |
| 2014/0217996 A1* | 8/2014 | Peker | H02M 3/1582 323/271 |

* cited by examiner

*Primary Examiner* — Nguyen Tran
(74) *Attorney, Agent, or Firm* — Nixon Peabody LLP; Zhou Lu

(57) ABSTRACT

The present disclosure provides a system and method for managing a four-switch BUCKBOOST converter with a combination of a Constant Off-time (COT) control and a Peak Current Mode (PCM) control. With the COT control, the four-switch BUCKBOOST converter can automatically and smoothly transition between a BUCK mode, a BUCK-BOOST mode, and a BOOST mode when input voltage varies. In some implementations, the four-switch BUCK-BOOST converter only requires a simple, low-power-consumption and robust system control loop compensation with the PCM control for inductor current, and, thus, eliminates the need for oscillator and slope compensation circuit. The PCM control is used to determine turn-off-timing of switches of the four-switch BUCKBOOST converter. The system control loop compensation can provide cycle-by-cycle current limit function to protect the converter and load from over-current damages.

18 Claims, 14 Drawing Sheets

ADVANCED CONSTANT OFF-TIME CONTROL FOR FOUR-SWITCH BUCKBOOST CONVERTER

CROSS-REFERENCE TO RELATED APPLICATION

This application claims priority to U.S. Provisional Application 62/649,328, titled "Advanced Constant Off-Time Control Four-switch BUCKBOOST Converter" and filed on Mar. 28, 2018, the disclosure of which is incorporated herein by reference in its entirety.

TECHNICAL FIELD

The disclosure generally relates to power converters.

BACKGROUND

As electronics devices move toward portable and mobile, battery becomes the major power source. However, due to characteristics of batteries, an output voltage of a battery pack could vary in a wide range between a fully charged state and a fully depleted state. Depending on the state of a battery, a charging voltage could be higher or lower than the battery voltage.

In addition, as USB Type C begins infiltrate the major market, voltage from a USB port is no longer fixed at 5V, and could vary in a wide range between 3.5V and 20V. In the meanwhile, downstream devices connected to such type of USB port may still need a voltage substantially around 5V, or close to the middle of 3.5V to 20V.

In all these situations, input voltage and output voltage of a power converter of an electronics device may crossover during a normal operation. Traditional BUCK (step down) converter or BOOST (step up) converter can only work with Input voltage either higher or lower, respectively, than output voltage. Thus, four-switch BUCKBOOST converter becomes the choice due to its flexibility with input and output voltage ranges.

A traditional control method for a BUCKBOOST converter is shown in FIG. 1. In the BUCKBOOST converter, all four switches are turned on and off once in every switching cycle. Also, energy of input power source is never transferred directly to an output. Instead, energy of input power source need to be stored in an inductor, and then passed on to the output. Thus, efficiency of the traditional BUCKBOOST converter is low. Further, the traditional BUCKBOOST has a high cost due to the need for high current rating devices. Other control methods based on peak current mode (PCM) or voltage mode (VM) control have also been used in controlling four-switch BUCKBOOST. However, all these control methods are based on fixed frequency control with clock signal to determine the timing of four switches.

Therefore, a new method is desired to control a four-switch BUCKBOOST converter.

SUMMARY

Systems and methods, in accordance with various examples of the present disclosure, provide a solution to the above-mentioned problems by managing a four-switch BUCKBOOST converter with a combination of a Constant Off-time (COT) control and a Peak Current Mode (PCM) control. With the COT control, the four-switch BUCK-BOOST converter can automatically and smoothly transition between a BUCK mode, a BUCKBOOST mode, and a BOOST mode when input voltage varies. In some implementations, the four-switch BUCKBOOST converter only requires a simple, low-power-consumption and robust system control loop compensation with the PCM control for inductor current, and, thus, eliminates the need for oscillator and slope compensation circuit. The PCM control is used to determine turn-off-timing of switches of the four-switch BUCKBOOST converter. The system control loop compensation can provide cycle-by-cycle current limit function to protect the converter and load from over-current damages.

In some implementations, timing of switches of the four-switch BUCKBOOST converter is determined by an off-time calculation circuit using peak current information. Thus, the present disclosure eliminates the need for a fixed clock signal in conventional four-switch BUCKBOOST converters.

In some implementations, the four-switch BUCKBOOST converter can automatically transition from a pulse-width modulation (PWM) to a pulse-frequency modulation (PFM) with the COT control. As a result, the four-switch BUCK-BOOST converter does not require a slope compensation that is required for a PCM control, and, thus, greatly simplifies control circuit and current consumption. In some implementations, with the PCM control, the system control loop compensation can be further simplified by reducing output double pole of inductor and output capacitor to single pole response.

In accordance with one aspect of the present disclosure, a computer-implemented method for managing a four-switch BUCKBOOST converter of a system with a combination of a Constant Off-time (COT) control and a Peak Current Mode (PCM) control, comprises: determining input voltage (VIN) and output voltage (VOUT) of the four-switch BUCK-BOOST converter; in an event that VIN is greater than a first threshold voltage, enabling a BUCK mode for the four-switch BUCKBOOST converter; in an event that VIN is lower than a second threshold voltage, enabling a BOOST mode for the four-switch BUCKBOOST converter; and in an event that VIN is between the second threshold voltage and the first threshold voltage, enabling a BUCKBOOST mode for the four-switch BUCKBOOST converter.

Additional features and advantages of the disclosure will be set forth in the description that follows, and will in part be obvious from the description; or can be learned by the practice of the principles set forth herein. The features and advantages of the disclosure can be realized and obtained by means of the instruments and combinations particularly pointed out in the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

Figure 1:
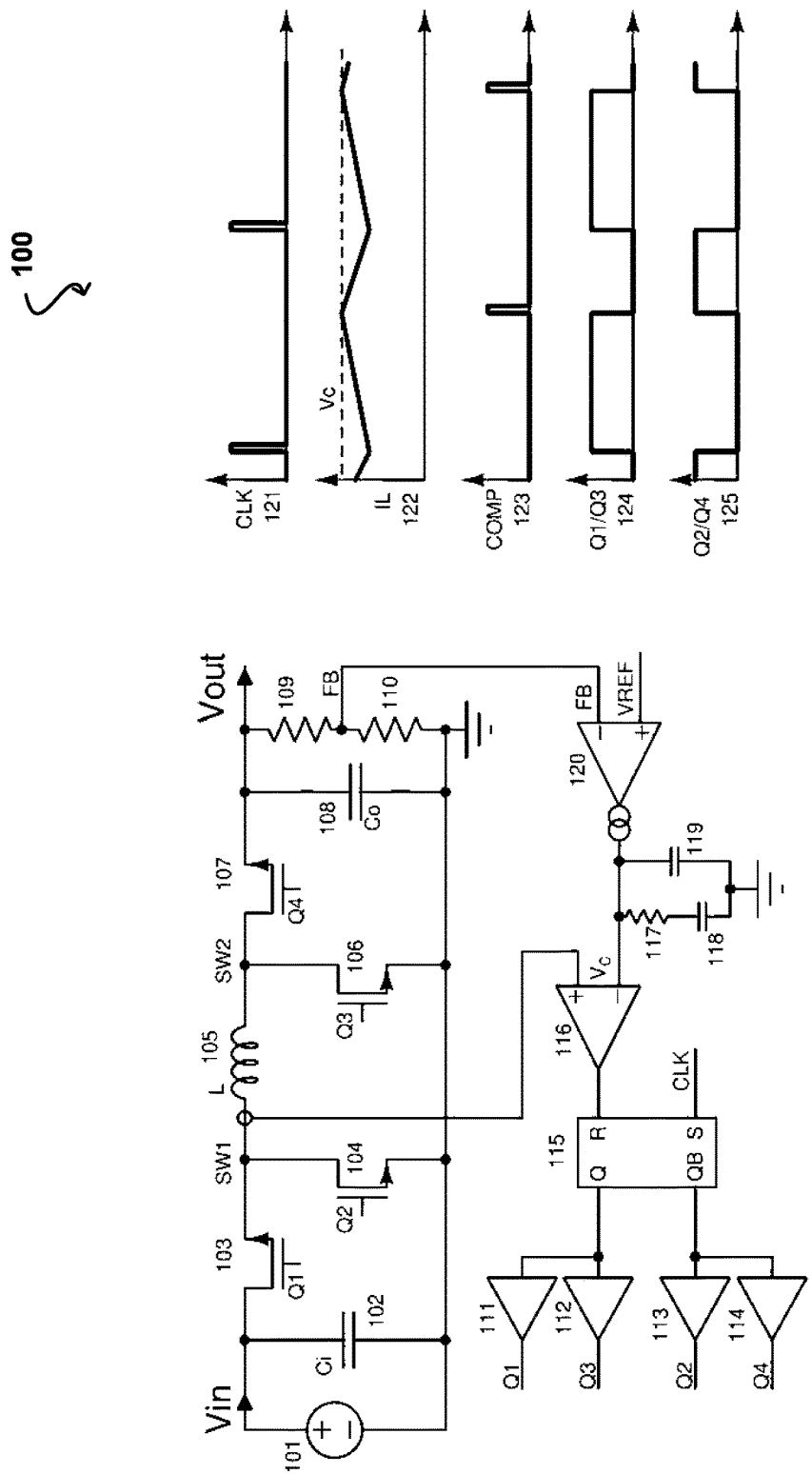
FIG. 1 illustrates a conventional control method for a four-switch BUCKBOOST converter.

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for managing a four-switch BUCK-BOOST converter with a combination of a Constant Off-time (COT) control and a Peak Current Mode (PCM) control. With the COT control, the four-switch BUCK-BOOST converter can automatically and smoothly transition between a BUCK mode, a BUCKBOOST mode, and a BOOST mode when input voltage varies. The PCM control is used to determine turn-off-timing of switches of the four-switch BUCKBOOST converter.

Figure 2:
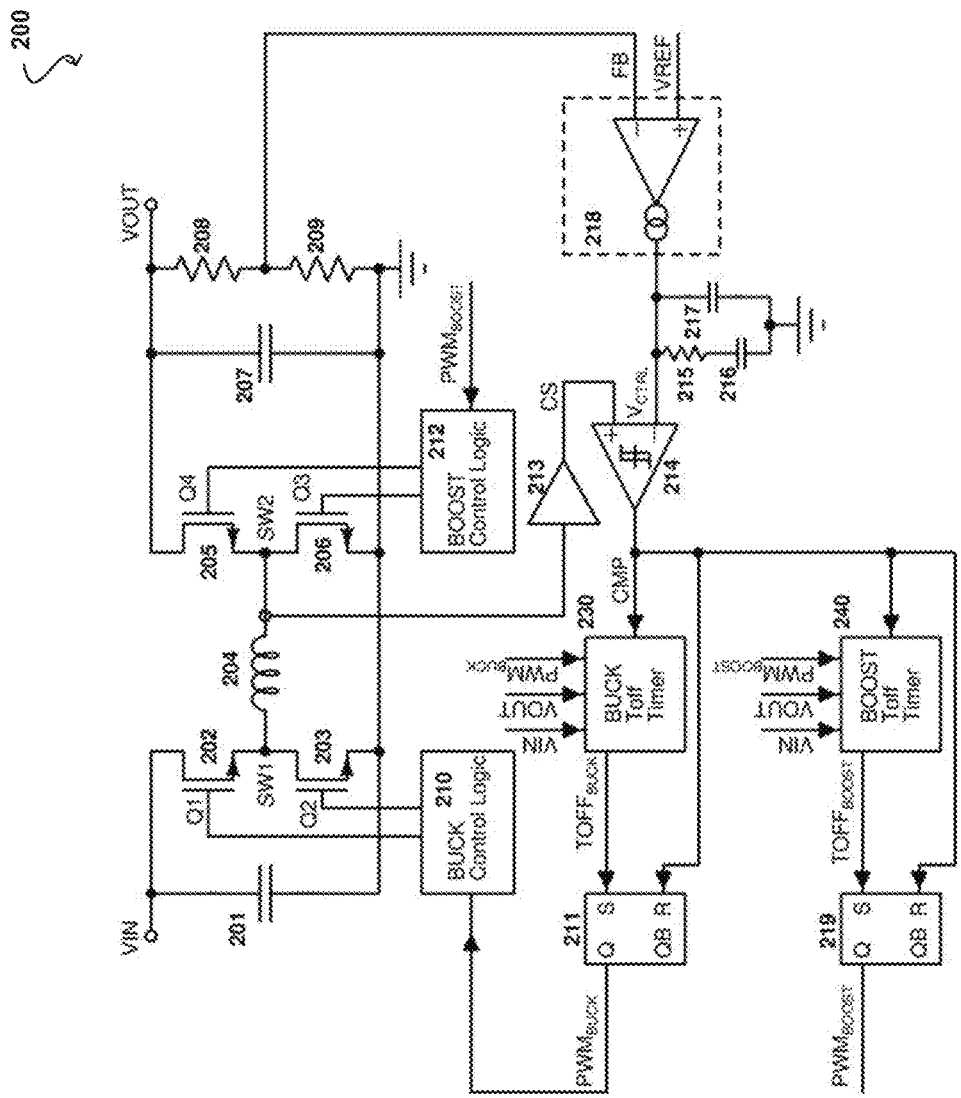
FIG. 2 illustrates an exemplary Constant Off-Time (COT) BUCKBOOST control method for an exemplary COT BUCKBOOST converter, in accordance with an implementation of the present disclosure.

FIG. 2 illustrates an exemplary Constant Off-Time (COT) BUCKBOOST control method for an exemplary COT BUCKBOOST converter 200, in accordance with an implementation of the present disclosure. In this example, the converter 200 comprises four switches Q1 202, Q2 203, Q3 206 and Q4 205, a voltage error amplifier 218, a peak current comparator 214, a BUCK T$_{off}$ timer 230, a BUCK control logic 210 coupled to the BUCK T$_{off}$ timer 230, a BOOST T$_{off}$ timer 240, and a BOOST control logic 212 coupled to the BOOST T$_{off}$ timer 240. In some implementations, the four switches Q1 202, Q2 203, Q3 206 and Q4 205 are power metal-oxide-semiconductor field-effect transistors (MOSFETs). Q1 202 and Q4 205 are high side power MOSFETs, respectively, while Q2 203 and Q3 206 are low side power MOSFETs, respectively.

Figure 3:
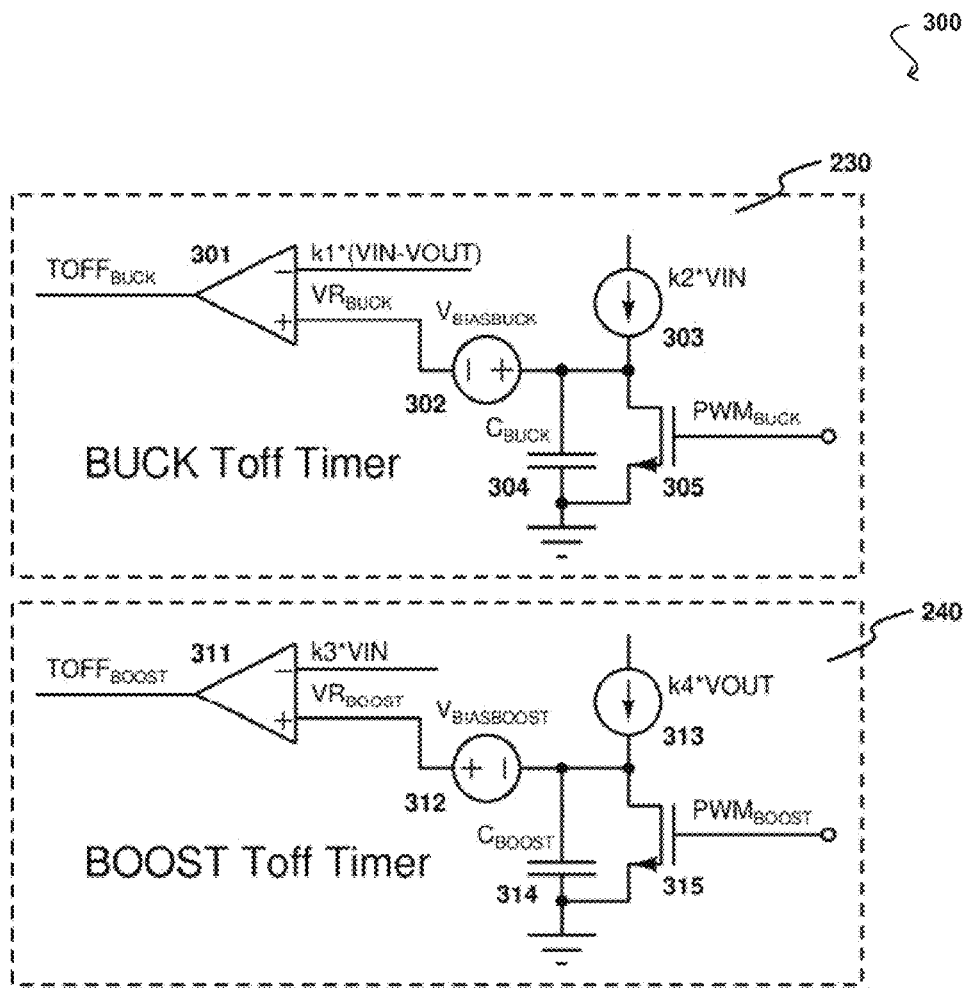
FIG. 3 illustrates an exemplary BUCK T$_{off}$ Timer and BOOST T$_{off}$ Timer of the exemplary COT BUCKBOOST converter in FIG. 2, in accordance with an implementation of the present disclosure.

The BUCK T$_{off}$ timer 230 and the BOOST T$_{off}$ time 240 are configured to calculate off time for each corresponding power switch of the converter 200, which is further illustrated in FIG. 3. As shown in FIG. 3, the timer (e.g., 230 or 240) can generate a reference voltage (e.g., VR$_{BUCK}$ or VR$_{BOOST}$) and a charging current source (e.g., 303 or 313) based on Vin and Vout. The BUCK T$_{off}$ timer 230 comprises a capacitor 304 and a comparator 301 while the BOOST T$_{off}$ timer 240 comprises a capacitor 314 and a comparator 311. Thus, the BUCK T$_{off}$ timer 230 and the BOOST T$_{off}$ time 240 can calculate an off time of BUCK switches (e.g., Q1 202 and Q2 203) and BOOST switches (e.g., Q3 206 and Q4 205), respectively, as follows:

$$T_{OFFBUCK} = C_{BUCK} \cdot \frac{k1 \cdot (VIN - VOUT) + V_{BIASBUCK}}{k2 \cdot VIN}$$

$$T_{OFFBUCK} = C_{BOOST} \cdot \frac{k3 \cdot VIN - V_{BIASBUCK}}{k4 \cdot VOUT}$$

In the above equations, k1 and k3 are voltage scaling factors while k2 and k4 are voltage to current scaling factors. By choosing different scaling factors, T$_{OFFBUCK}$/T$_{OFFBOOST}$ and corresponding switching frequency can be adjusted.

In this examples, the BUCK T$_{off}$ timer 230 further comprises a bias voltage V$_{BIASBUCK}$ while the BOOST T$_{off}$ timer 240 further comprises a bias voltage V$_{BIASBOOST}$, in order to achieve automatic transition between a BUCK mode, a BUCKBOOST mode, and a BOOST mode. When VIN of the converter 200 is much higher than VOUT of the converter 200, T$_{OFFBOOST}$ is much longer than a switching period of the converter 200 such that Q4 205 is always on. In this scenario, T$_{OFFBUCK}$ could be determined according the above equation while the converter 200 operates in the BUCK mode. When working in the BUCK mode, the BOOST T$_{off}$ timer 240 is never triggered. Q3 is in OFF state and Q4 is in ON state at all time. A current sensing amplifier 213 is configured to detect switch current of Q1 202. Off time of Q1 202 is determined based upon a time when output of the current sensing amplifier 213 reaches the control voltage Vail of the comparator 214. After Q1 202 turns off, the BUCK T$_{off}$ timer 230 starts to count. Once the BUCK T$_{off}$ timer 230 triggers, Q1 202 is turned on again to start another cycle.

As VIN drops and gets close to VOUT, T$_{OFFBOOST}$ will reduce due to offset voltage V$_{BIASBOOST}$, even when VIN is still higher than VOUT. When T$_{OFFBOOST}$ reduces to a threshold level, Q4 205 will start to turn off and Q3 206 turns on. Now, the converter 200 starts to work in the BUCK-BOOST mode. While in the BUCKBOOST mode, Q1 202 and Q3 206 are initially in ON state. Current of inductor 204 ramps up by VIN. The current sensing amplifier 213 is configured to detect current of inductor 204. When output of the current sensing amplifier 213 reaches the control voltage V$_{ctrl}$, both Q1 202 and Q3 206 will be turned off and Q2 203 and Q4 205 will be turned on. Now, both the BUCK T$_{off}$ timer 230 and the BOOST T$_{off}$ timer 240 will start to count. In this scenario, T$_{OFFBUCK}$ is much smaller than T$_{OFFBOOST}$. Initially, the BUCK T$_{off}$ timer 230 will be triggered, which turns off Q2 203 and turns on Q1 202. After a wait time close to a switching cycle, the BOOST $T_{off}$ timer 240 is triggered, which turns off Q4 205 and turns on Q3 206. Then, another switch cycle starts to repeat.

As VIN continues dropping below VOUT to a point when k1·(VIN−VOUT)+$V_{BIASBUCK}$ is less than k2·VIN, $T_{OFFBUCK}$ will reduce to zero. Then, Q1 202 will be on all the time. The converter 200 starts to work in the BOOST mode. In the BOOST mode, the BUCK $T_{off}$ timer 230 is always in a trigger state because VIN−VOUT is negative, which keeps Q1 202 in ON state while keeps Q2 203 in OFF state all the time.

Figure 4A:
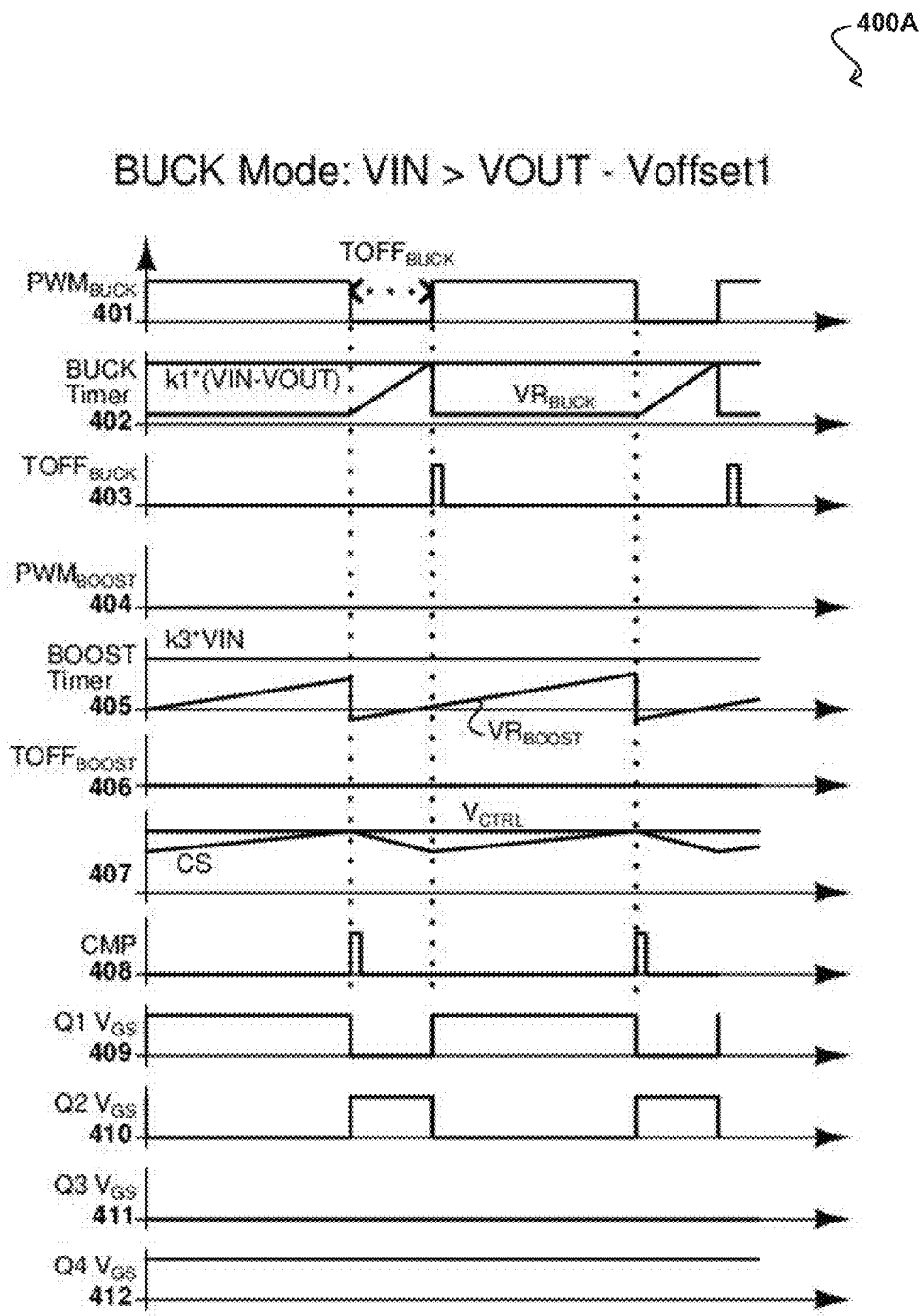
FIGS. 4A-4C illustrate waveforms of the exemplary COT BUCKBOOST converter in FIG. 2, in accordance with an implementation of the present disclosure.
Figure 4B:
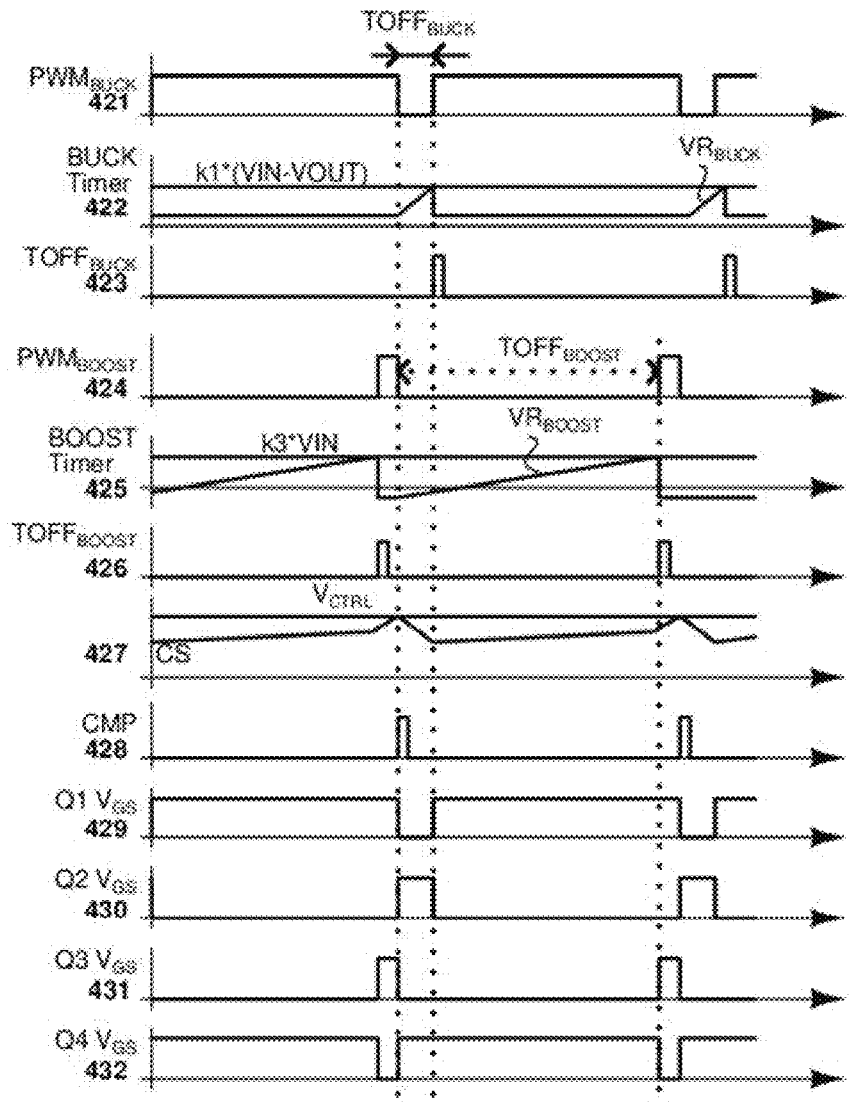
Figure 4C:
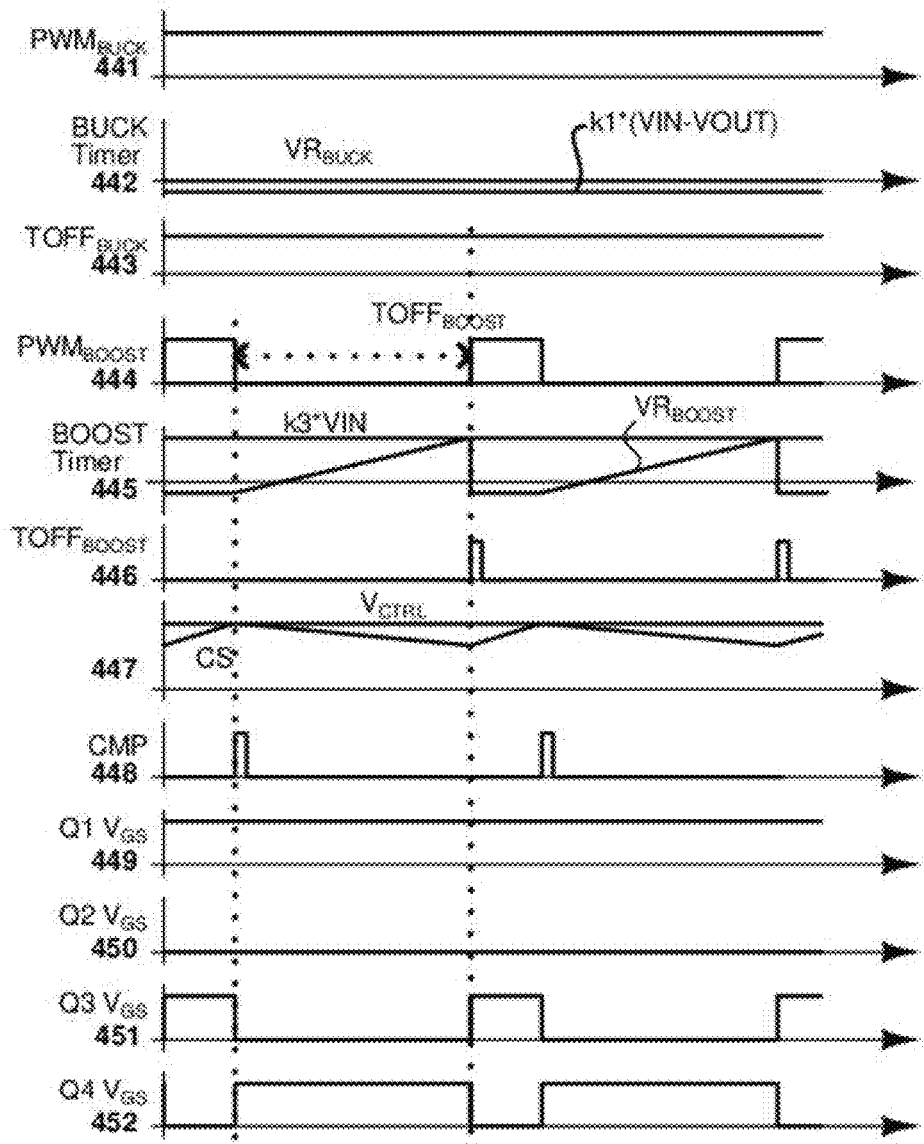

FIGS. 4A-4C illustrate waveforms of the exemplary COT BUCKBOOST converter 200 in FIG. 2, in accordance with an implementation of the present disclosure. As shown in FIGS. 4A-4C, the converter 200 can adjust its operation mode based upon calculated off time of the BUCK $T_{off}$ timer 230 and the BOOST $T_{off}$ timer 240. The transition between a BUCK mode, a BUCKBOOST mode, and a BOOST mode can be automatic and seamless.

In some implementations, the BUCK $T_{off}$ timer 230 and the BOOST $T_{off}$ timer 240 are matched with each other. For example, the parameters in the BUCK $T_{off}$ timer 230 and the BOOST $T_{off}$ timer 240 can be substantially correlated or matched as $$C_{BUCK} \cdot \frac{k1}{k2} = C_{BOOST} \cdot \frac{k3}{k4}.$$

Thus, the switching frequency in both BUCK mode and BOOST mode can be kept the constant.

Figure 5:
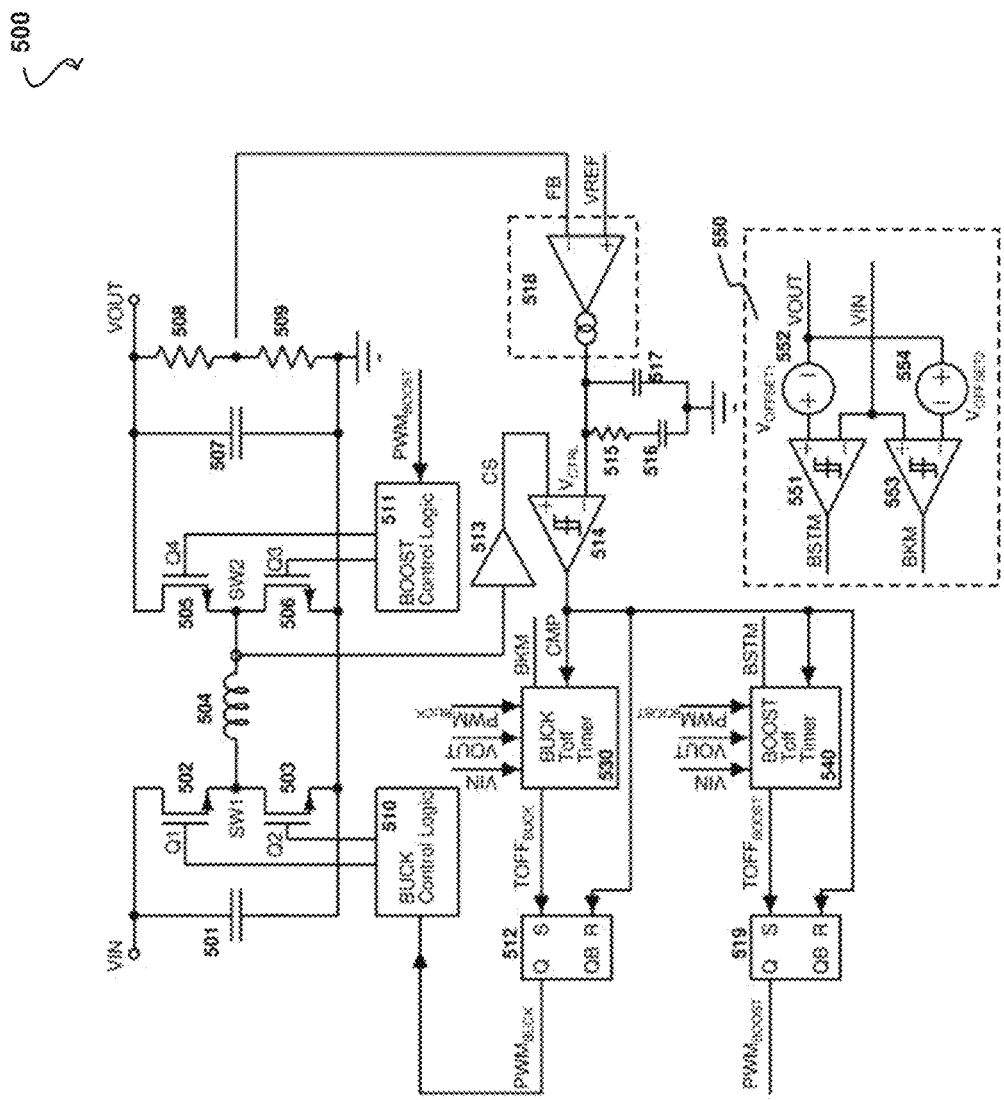
FIG. 5 illustrates another exemplary Constant Off-Time (COT) BUCKBOOST control method for an exemplary COT BUCKBOOST converter, in accordance with an implementation of the present disclosure.
Figure 6:
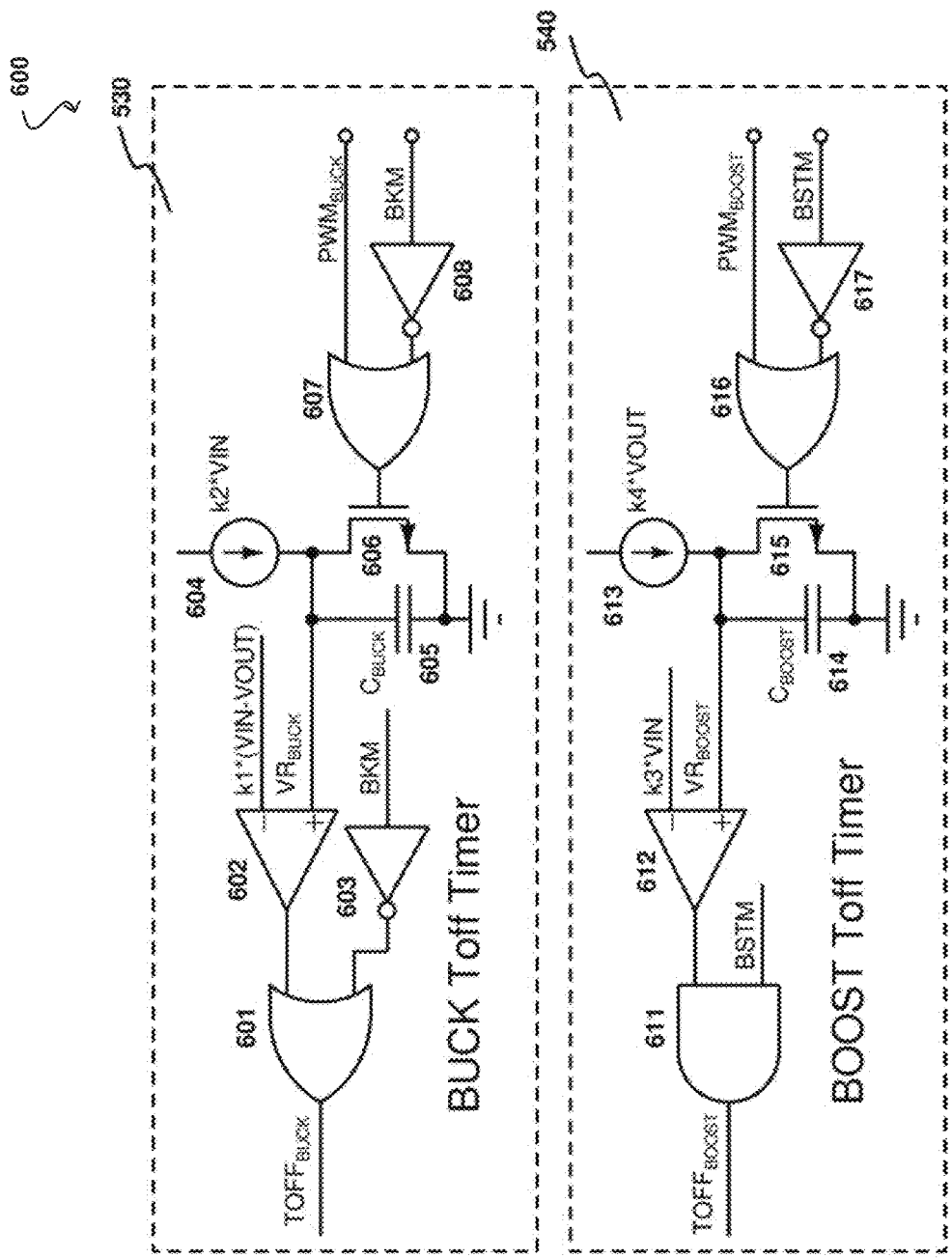
FIG. 6 illustrates another exemplary BUCK T$_{off}$ Timer and BOOST T$_{off}$ Timer of the exemplary COT BUCKBOOST converter in FIG. 5, in accordance with an implementation of the present disclosure.

FIG. 5 illustrates another exemplary Constant Off-Time (COT) BUCKBOOST control method for an exemplary COT BUCKBOOST converter 500, in accordance with an implementation of the present disclosure. In this example, the converter 500 comprises four switches Q1 502, Q2 503, Q3 506 and Q4 505, a BUCK $T_{off}$ timer 530, a BUCK control logic 510 coupled to the BUCK $T_{off}$ timer 530, a BOOST $T_{off}$ timer 540, a BOOST control logic 511 coupled to the BOOST $T_{off}$ timer 540, a voltage error amplifier 518, a peak current comparator 514, and comparators 551 and 553. The BUCK $T_{off}$ timer 530 and the BOOST $T_{off}$ timer 540 are further illustrated in FIG. 6. The comparators 551 and 553 are used to determine an operation mode of the converter 500 based upon relationship between VIN and VOUT. The characteristics of these two comparators 551 and 553 are illustrated in FIG. 7.

Figure 7:
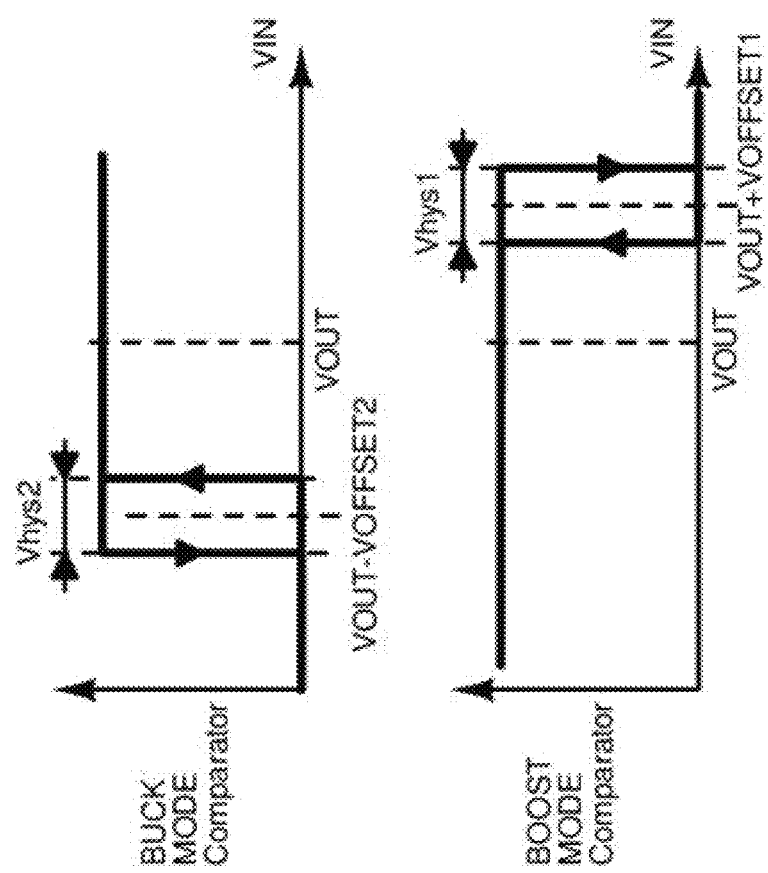
FIG. 7 illustrates an exemplary mode comparator state diagram of the exemplary COT BUCKBOOST converter in FIG. 5, in accordance with an implementation of the present disclosure.
Figure 8A:
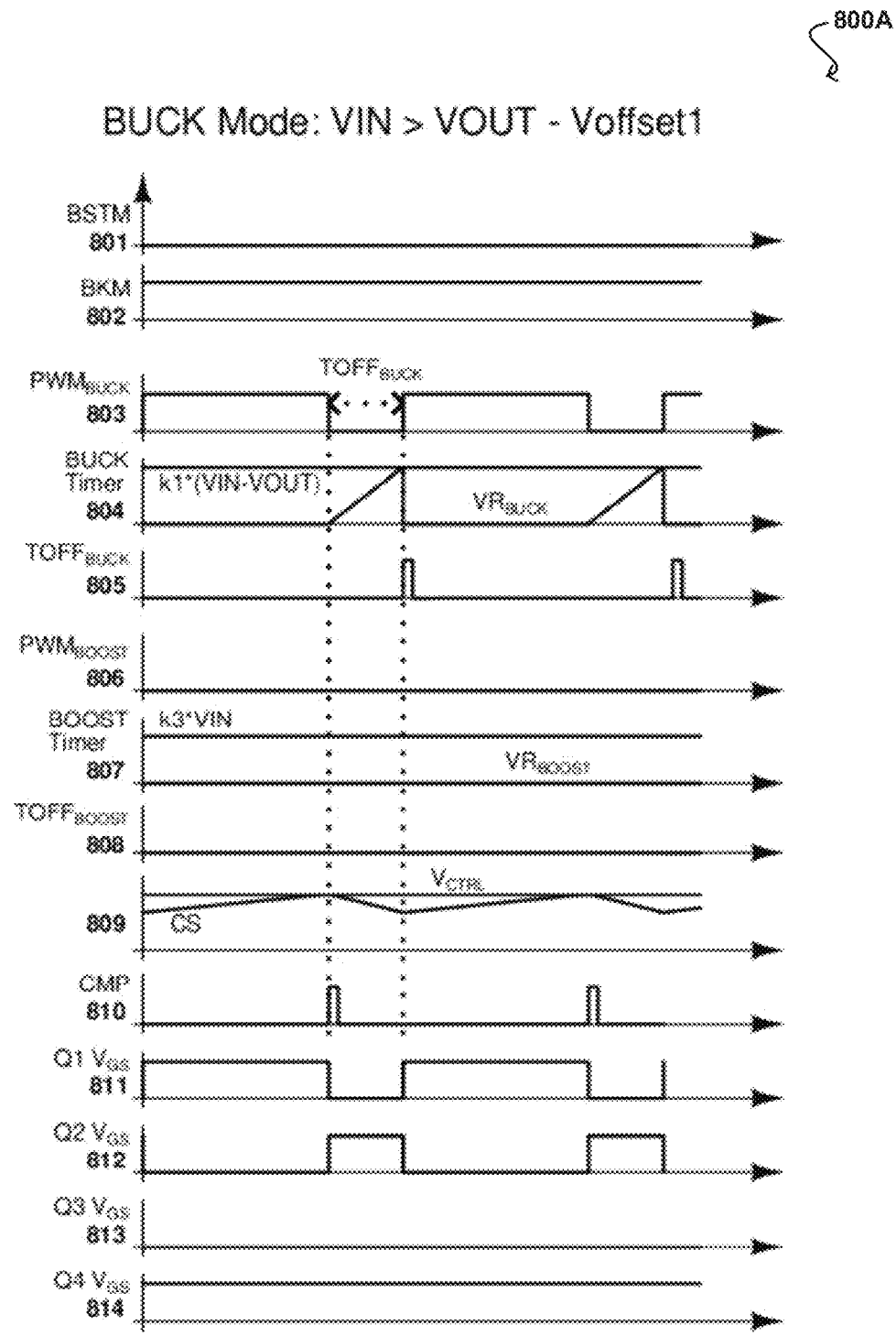
FIGS. 8A-8C illustrate waveforms of the exemplary COT BUCKBOOST converter in FIG. 5, in accordance with an implementation of the present disclosure.
Figure 8B:
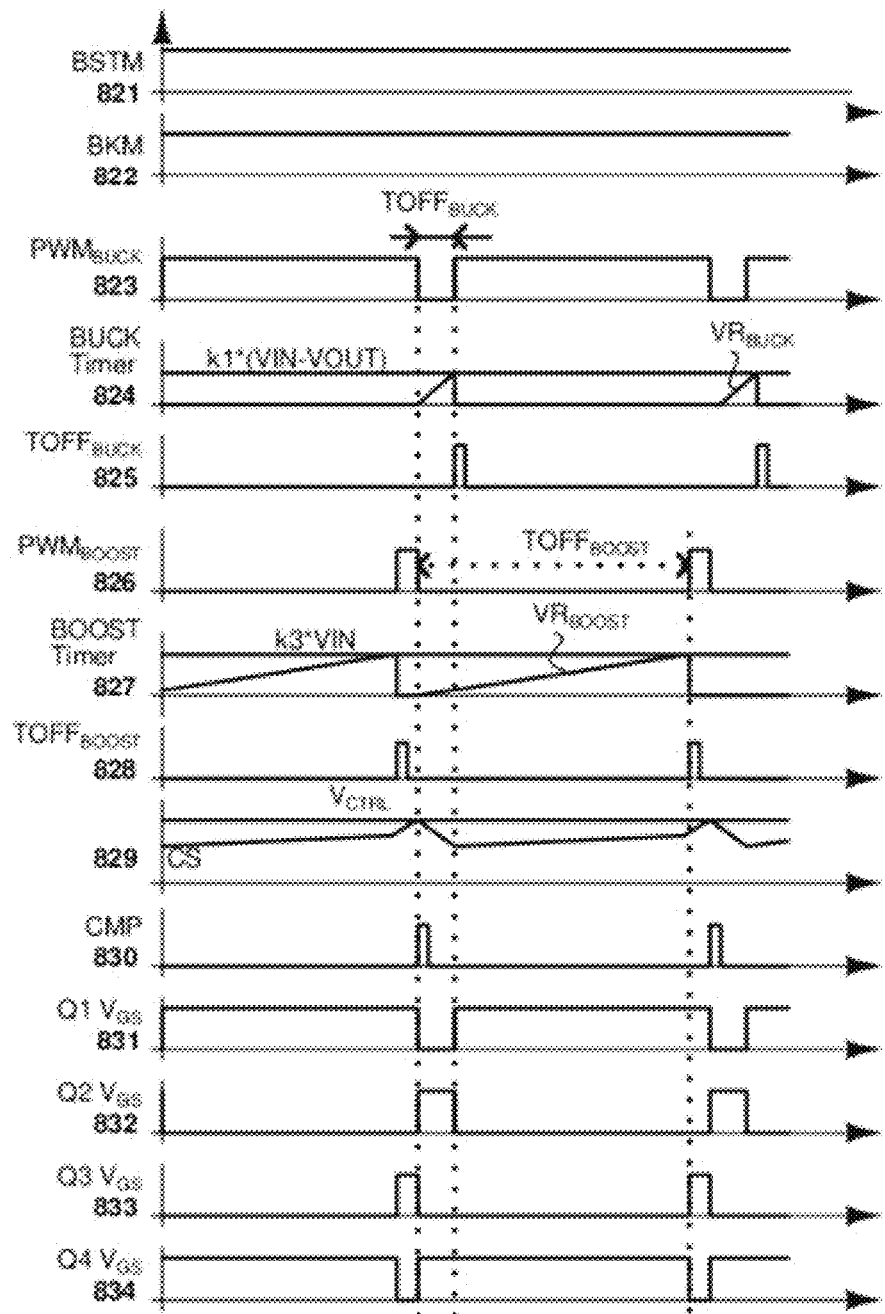
Figure 8C:
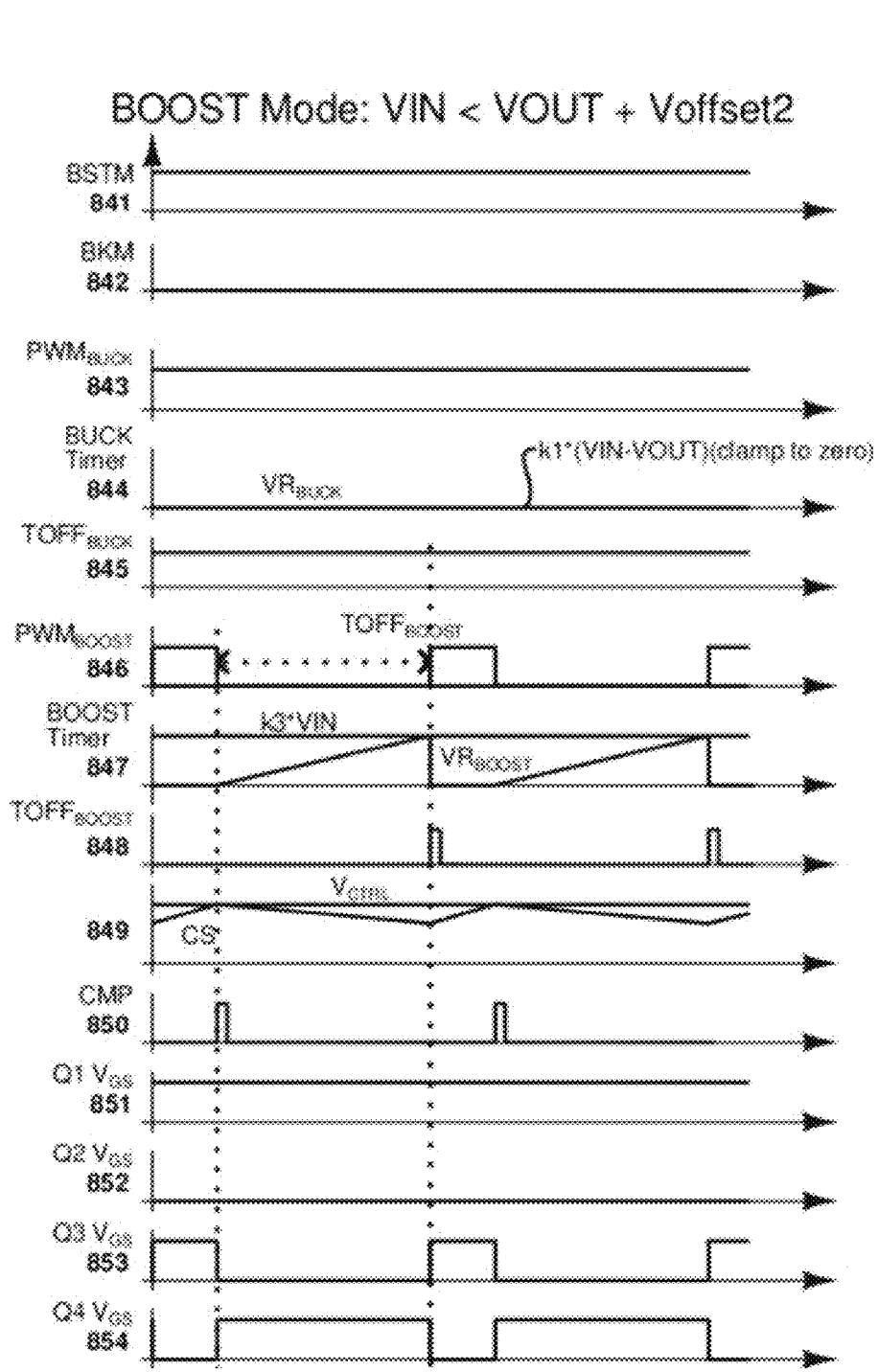

In FIG. 7, when VIN is higher than VOUT+VOFFSET2, the converter 500 disenables the BOOST mode and only enables switching Q1 502 and Q2 503. In this scenario, Q3 506 is in OFF state while Q4 505 is in ON state all the time. When VIN becomes lower than VOUT−VOFFSET1, the converter 500 will disenable the BUCK mode and only enables switching Q3 506 and Q4 505. In this scenario, Q1 502 is in ON state while Q2 503 is in OFF state. When VIN is between VOUT−VOFFSET1 and VOUT+VOFFSET2, the converter 500 operates in the BUCKBOOST mode, and enables switching all four switches during each switching cycle. Waveforms of the exemplary COT BUCKBOOST converter 500 is illustrated in FIGS. 8A-8C.

In this implementation, the converter 500 determines operation mode using comparators 551 and 553 instead of capacitance and current source. Thus, operation modes can be controlled with more accurately with a smaller circuit size.

Although only certain components are shown within the exemplary systems 200-800 in FIGS. 2-8, respectively, various types of electronic or computing components that are capable of processing or storing data, or receiving or transmitting signals, can also be included in the exemplary systems 200-800. Further, the electronic or computing components in the exemplary systems 200-800 can be configured to execute various types of applications.

The above discussion is meant to be illustrative of the principles and various examples of the present disclosure. Numerous variations and modifications will become apparent once the above disclosure is fully appreciated.

Figure 9:
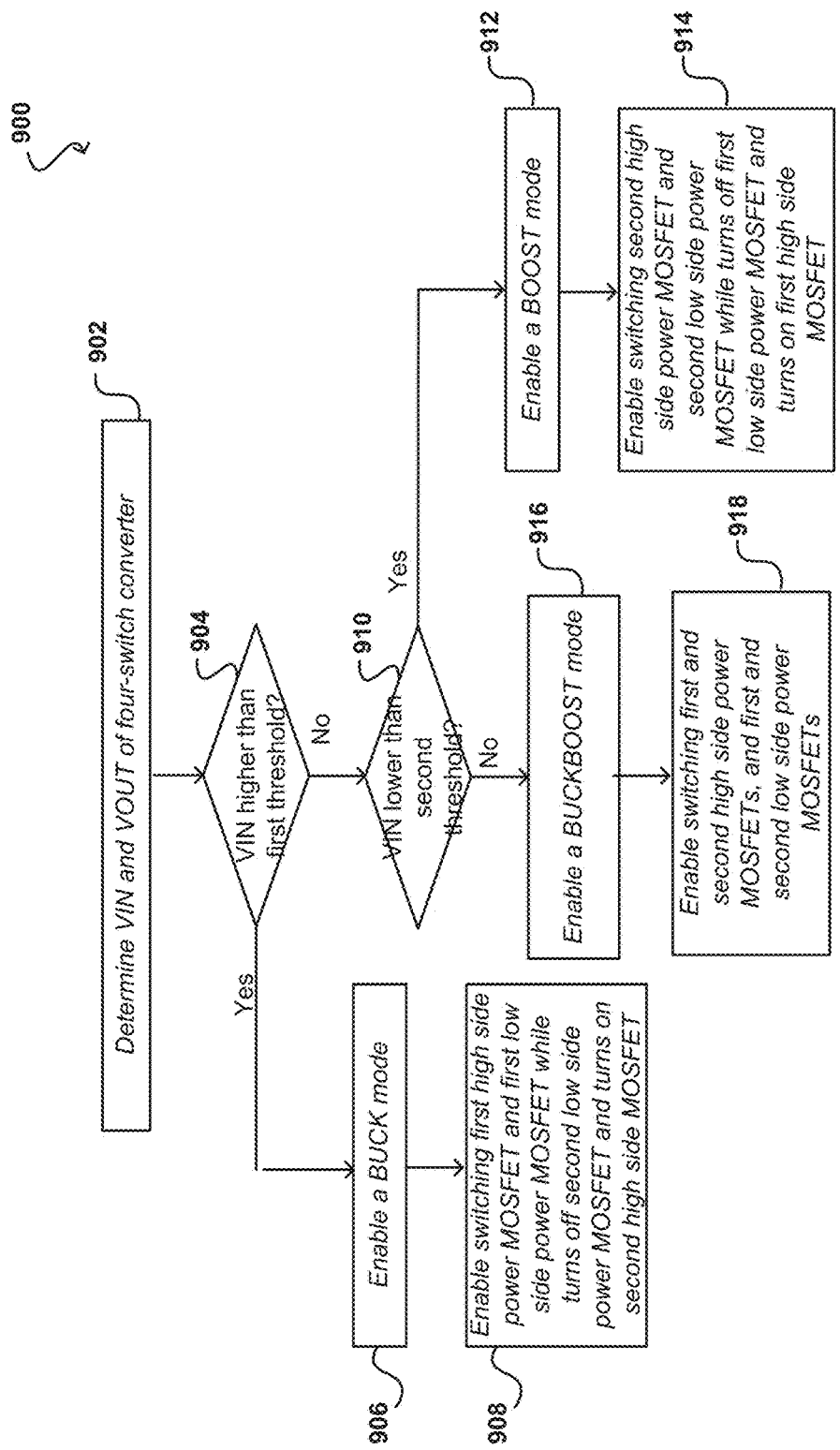
FIG. 9 is an exemplary method for controlling a Constant Off-Time (COT) BUCKBOOST converter of a system, in accordance with an implementation of the present disclosure.

FIG. 9 is an exemplary method 900 for controlling a Constant Off-Time (COT) BUCKBOOST converter of a system, in accordance with an implementation of the present disclosure. It should be understood that the exemplary method 900 is presented solely for illustrative purposes, and that other methods in accordance with the present disclosure can include additional, fewer, or alternative steps performed in similar or alternative orders, or in parallel. The exemplary method 900 starts at step 902 by determining VIN and VOUT of the BUCKBOOST converter. The BUCKBOOST converter comprises four switches (e.g., two high side power MOSFETs and two low side power MOSFETs), a first comparator, a BUCK $T_{off}$ timer, and a BOOST $T_{off}$ timer, as illustrated in FIGS. 2-8. In some implementations, the BUCKBOOST converter further comprises a voltage error amplifier, and a peak current comparator. In some implementations, the BUCKBOOST converter further comprises second and third comparators to determine an operation mode of the BUCKBOOST converter based upon relationship between VIN and VOUT.

At step 904, the system, or a BUCK control logic and a BOOST control logic of the system (hereafter "system"), determines whether VIN of the BUCKBOOST converter is higher than a first threshold voltage. In some implementations, the first threshold voltage is much higher than VOUT of the BUCKBOOST converter. In some implementations, the first threshold voltage is equivalent to VOUT+VOFFSET2. VOFFSET2 is an offset voltage to a third comparator of the BUCKBOOST converter.

At step 906, in an event that VIN is higher than the first threshold voltage, the system enables a BUCK mode for the BUCKBOOST converter. At step 908, the system enables switching first high side power MOSFET and first low side power MOSFET while turns on second high side power MOSFET and turns off second low side power MOSFET, as illustrated in FIGS. 2-8. In some implementations, in the BUCK mode, a current sensing amplifier is configured to detect switch current of the first high side power MOSFET. Off time of the first high side power MOSFET is determined based upon a time when output of the current sensing amplifier reaches a control voltage of the first comparator. When working in the BUCK mode, the BOOST $T_{off}$ timer is never triggered.

At step 910, the system determines whether VIN of the BUCKBOOST converter is lower than a second threshold voltage. In some implementations, the second threshold voltage is substantially lower than VOUT such that $T_{OFFBUCK}$ reduces to zero. In some implementations, the second threshold voltage is equivalent to VOUT−VOFFSET1. VOFFSET1 is an offset voltage to a second comparator of the BUCKBOOST converter.

At step 912, in an event that VIN is lower than the second threshold voltage, the system enables a BOOST mode for the BUCKBOOST converter. At step 914, the system enables switching second high side power MOSFET and second low side power MOSFET while turns off first low side power MOSFET and turns on first high side power MOSFET, as illustrated in FIGS. 2-8. In the BOOST mode, the BUCK $T_{off}$ timer is in a trigger state to keep the first high side power MOSFET in ON state and the first low side power MOSFET in OFF state.

At step 916, in an event that VIN is between the first threshold voltage and the second threshold voltage, the system enables a BUCKBOOST mode for the BUCK-BOOST converter. At step 916, the system enables switching first and second high side power MOSFETs, and first and second low side power MOSFETs, as illustrated in FIGS. 2-8. In some implementations, while in the BUCKBOOST mode, the current sensing amplifier is configured to detect current of a power inductor connected to output of the first high side power MOSFET. When output of the current sensing amplifier reaches the control voltage of the first comparator, both the first high side power MOSFET and the second low side power MOSFET will be turned off while the first low side power MOSFET and the second high side power MOSFET will be turned on. Then, both the BUCK $T_{off}$ timer and the BOOST $T_{off}$ timer start to count. Initially, the BUCK $T_{off}$ timer is triggered, which turns off the first low side power MOSFET and turns on the first high side power MOSFET. After a wait time close to a switching cycle, the BOOST $T_{off}$ timer is triggered, which turns off the second high side power MOSFET and turns on the second low side power MOSFET. Then, another switch cycle starts to repeat.

Figure 10:
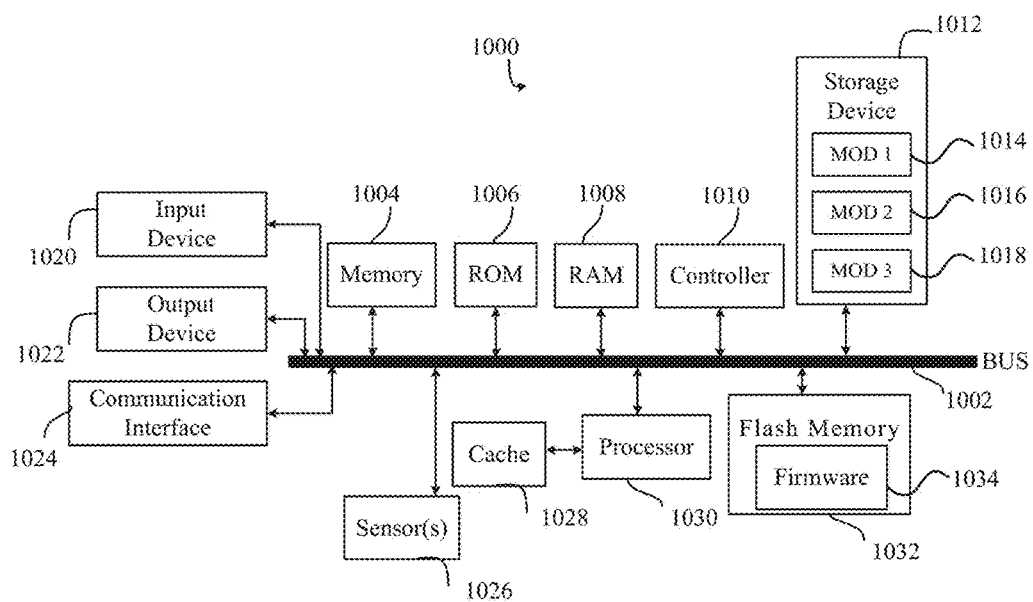
FIG. 10 illustrates an exemplary system, in accordance with various examples of the present disclosure.

A brief introductory description of example system and network, as illustrated in FIG. 10, is disclosed herein. These variations shall be described herein as the various examples are set forth. The present disclosure now turns to FIG. 10.

FIG. 10 illustrates an example computing system 1000, in which components of the computing system are in electrical communication with each other using a bus 1002. The system 1000 includes a processing unit (CPU or processor) 1030, and a system bus 1002 that couples various system components, including the system memory 1004 (e.g., read only memory (ROM) 1006 and random access memory (RAM) 1008), to the processor 1030. The system 1000 can include a cache of high-speed memory that is connected directly with, in close proximity to, or integrated as part of the processor 1030. The system 1000 can copy data from the memory 1004 and/or the storage device 1012 to the cache 1028 for quick access by the processor 1030. In this way, the cache can provide a performance boost for processor 1030 while waiting for data. These and other modules can control or be configured to control the processor 1030 to perform various actions. Other system memory 1004 may be available for use as well. The memory 1004 can include multiple different types of memory with different performance characteristics. The processor 1030 can include any general purpose processor and a hardware module or software module, such as module 1 1014, module 2 1016, and module 3 1018 embedded in storage device 1012. The hardware module or software module is configured to control the processor 1030, as well as a special-purpose processor where software instructions are incorporated into the actual processor design. The processor 1030 may essentially be a completely self-contained computing system that contains multiple cores or processors, a bus, memory controller, cache, etc. A multi-core processor may be symmetric or asymmetric.

To enable user interaction with the computing device 1000, an input device 1020 is provided as an input mechanism. The input device 1020 can comprise a microphone for speech, a touch-sensitive screen for gesture or graphical input, keyboard, mouse, motion input, and so forth. In some instances, multimodal systems can enable a user to provide multiple types of input to communicate with the system 1000. In this example, an output device 1022 is also provided. The communications interface 1024 can govern and manage the user input and system output.

Storage device 1012 can be a non-volatile memory to store data that are accessible by a computer. The storage device 1012 can be magnetic cassettes, flash memory cards, solid state memory devices, digital versatile disks, cartridges, random access memories (RAMs) 1008, read only memory (ROM) 1006, and hybrids thereof.

The controller 1010 can be a specialized microcontroller or processor on the system 1000, such as a BMC (baseboard management controller). In some cases, the controller 1010 can be part of an Intelligent Platform Management Interface (IPMI). Moreover, in some cases, the controller 1010 can be embedded on a motherboard or main circuit board of the system 1000. The controller 1010 can manage the interface between system management software and platform hardware. The controller 1010 can also communicate with various system devices and components (internal and/or external), such as controllers or peripheral components, as further described below.

The controller 1010 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1010 to initiate or conduct specific hardware recovery procedures or operations, as further described below.

The controller 1010 can also include a system event log controller and/or storage for managing and maintaining events, alerts, and notifications received by the controller 1010. For example, the controller 1010 or a system event log controller can receive alerts or notifications from one or more devices and components, and maintain the alerts or notifications in a system event log storage component.

Flash memory 1032 can be an electronic non-volatile computer storage medium or chip that can be used by the system 300 for storage and/or data transfer. The flash memory 1032 can be electrically erased and/or reprogrammed. Flash memory 1032 can include EPROM (erasable programmable read-only memory), EEPROM (electrically erasable programmable read-only memory), ROM, NVRAM, or CMOS (complementary metal-oxide semiconductor), for example. The flash memory 1032 can store the firmware 1034 executed by the system 1000, when the system 1000 is first powered on, along with a set of configurations specified for the firmware 1034. The flash memory 1032 can also store configurations used by the firmware 1034.

The firmware 1034 can include a basic input/output system or equivalents, such as an EFI (Extensible Firmware Interface) or UEFI (Unified Extensible Firmware Interface). The firmware 1034 can be loaded and executed as a sequence program each time the system 1000 is started. The firmware 1034 can recognize, initialize, and test hardware present in the system 1000 based on the set of configurations. The firmware 334 can perform a self-test, such as a POST (Power-on-Self-Test), on the system 1000. This self-test can test functionality of various hardware components such as hard disk drives, optical reading devices, cooling devices, memory modules, expansion cards, and the like. The firmware 1034 can address and allocate an area in the memory 1004, ROM 306, RAM 308, and/or storage device 1012, to store an operating system (OS). The firmware 1034 can load a boot loader and/or OS, and give control of the system 1000 to the OS.

The firmware 1034 of the system 1000 can include a firmware configuration that defines how the firmware 1034 controls various hardware components in the system 1000. The firmware configuration can determine the order in which the various hardware components in the system 1000 are started. The firmware 1034 can provide an interface, such as an UEFI, that allows a variety of different parameters to be set, which can be different from parameters in a firmware default configuration. For example, a user (e.g., an administrator) can use the firmware 1034 to specify clock and bus speeds; define what peripherals are attached to the system 1000; set thresholds of operation parameters (e.g., fan speeds and CPU temperature limits); and/or provide a variety of other parameters that affect overall performance and power usage of the system 1000. While firmware 1034 is illustrated as being stored in the flash memory 1032, one of ordinary skill in the art will readily recognize that the firmware 1034 can be stored in other memory components, such as memory 1004 or ROM 1006.

System 1000 can include one or more sensors 1026. The one or more sensors 1026 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1026 can communicate with the processor, cache 1028, flash memory 1032, communications interface 1024, memory 1004, ROM 306, RAM 1008, controller 1010, and storage device 1012, via the bus 1002, for example. The one or more sensors 1026 can also communicate with other components in the system via one or more different means, such as inter-integrated circuit (I2C), general purpose output (GPO), and the like. Different types of sensors (e.g., sensors 1026) on the system 1000 can also report to the controller 1010 on parameters, such as cooling fan speeds, power status, operating system (OS) status, hardware status, and so forth.

For clarity of explanation, in some instances, the present disclosure may be presented as including individual functional blocks, such as devices, device components, steps or routines in a method embodied in software, or combinations of hardware and software.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for managing a four-switch BUCKBOOST converter of a system with a combination of a Constant Off-time (COT) control and a Peak Current Mode (PCM) control, comprising:
    determining an input voltage (VIN) and an output voltage (VOUT) of the four-switch BUCKBOOST converter;
    in an event that VIN is greater than a first threshold voltage, enabling a BUCK mode for the four-switch BUCKBOOST converter;
    in an event that VIN is an a second threshold voltage, enabling a BOOST mode for the four-switch BUCKBOOST converter;
    in an event that VIN is between the second threshold voltage and the first threshold voltage, enabling a BUCKBOOST mode for the four-switch BUCKBOOST converter,
    wherein the BUCK $T_{off}$ timer comprises a BUCK capacitor and a BUCK comparator while the BOOST $T_{off}$ timer comprises a BOOST capacitor and a BOOST comparator, wherein the BUCK $T_{off}$ timer calculates the off time for the first high side switch and the first low side switch using the following formula:

$$T_{OFFBUCK} = C_{BUCK} \cdot \frac{k1 \cdot (VIN - VOUT) + V_{BIASBUCK}}{k2 \cdot VIN}$$

wherein $C_{BUCK}$ is capacitance of the BUCK capacitor and $V_{BIASBUCK}$ is a bias voltage for the BUCK comparator,
wherein the BOOST $T_{off}$ timer calculates off time for the second high side switch and the second low side switch using the following formula:

$$T_{OFFBOOST} = C_{BOOST} \cdot \frac{k3 \cdot VIN - V_{BIASBOOST}}{k4 \cdot VOUT}$$

wherein $C_{BOOST}$ is capacitance of the BOOST capacitor and $V_{BIASBOOST}$ is a bias voltage for the BOOST comparator,
wherein k1 and k3 are voltage scaling factors while k2 and k4 are voltage to current scaling factors.

2. The computer-implemented method of claim 1, wherein the four-switch BUCKBOOST converter comprises four switches, a voltage error amplifier, a peak current comparator; a BUCK $T_{off}$ timer, and a BOOST $T_{off}$ timer, wherein the four switches comprise a first high side switch, a first low side switch, a second high side switch, and a second low side switch.

3. The computer-implemented method of claim 2, wherein the first high side switch, the first low side switch, the second high side switch, and the second low side switch are power metal-oxide-semiconductor field-effect transistors (MOSFETs).

4. The computer-implemented method of claim 2, further comprising:
    calculating an off time for the first high side switch and the first low side switch using the BUCK $T_{off}$ timer; and
    calculating an off time for the second high side switch and the second low side switch using the BOOST $T_{off}$ timer.

5. The computer-implemented method of claim 1, wherein the first threshold voltage is much higher than VOUT.

6. The computer-implemented method of claim 5, wherein, while in the BUCK mode, the BOOST $T_{off}$ timer is never triggered, and wherein the second low side switch is in an OFF state and the second high side switch is in an ON state.

7. The computer-implemented method of claim 6, further comprising:
    detecting a switch current of the first high side switch using a current sensing amplifier; and
    determining the off time of the first high side switch based upon a time when an output of the current sensing amplifier reaches a control voltage of the peak current comparator.

8. The computer-implemented method of claim 7, further comprising:
    enabling the BUCK $T_{off}$ timer to start to count after the first high side switch turns off.

9. The computer-implemented method of claim 8, wherein, in the BUCKBOOST mode, the first high side switch and the second low side switch are initially in the ON state, the method further comprising:
    detecting switch current of the first high side switch using the current sensing amplifier; and in response to the output of the current sensing amplifier reaching the control voltage of the peak current comparator, turning off the first high side switch and the second low side switch while turning on the second high side switch and the first low side switch.

10. The computer-implemented method of claim 9, further comprising:
enabling both the BUCK $T_{off}$ timer and the BOOST $T_{off}$ timer to count.

11. The computer-implemented method of claim 1, wherein the second threshold voltage is lower than VOUT such that $T_{OFFBUCK}$ substantially reduces to zero.

12. The computer-implemented method of claim 11, wherein, while in the BOOST mode, the BUCK $T_{off}$ timer is in a trigger state such that the first high side switch is in an ON state while the first low side switch is in an OFF state.

13. The computer-implemented method of claim 1, wherein the four-switch BUCKBOOST converter further comprises a first comparator and a second comparator, the method further comprising:
determining an operation mode of the four-switch BUCKBOOST converter based upon relationship between VIN and VOUT using the first comparator and the second comparator.

14. The computer-implemented method of claim 13, wherein the first threshold voltage is substantially equal to VOUT plus VOFFSET2, wherein VOFFSET2 is a second offset voltage of the second comparator, and wherein when the VIN is higher than VOUT plus VOFFSET2, the method further comprising:
disenabling the BOOST mode; and
enabling switching the first high side switch and the first low side switch.

15. The computer-implemented method of claim 13, wherein the second threshold voltage is substantially equal to VOLT minus VOFFSET1, wherein VOFFSET1 is a first offset voltage of the first comparator, and wherein when the VIN is lower than VOUT minus VOFFSET1, the method further comprising:
disenabling the BUCK mode; and
enabling switching the second high side switch and the second low side switch.

16. The computer-implemented method of claim 13, wherein when VIN is between VOUT−VOFFSET1 and VOUT+VOFFSET2, the method further comprising:
enabling switching the first high side switch, the first low side switch, the second high side switch, and the second low side switch during each switching cycle.

17. A system including a four-switch BUCKBOOST converter, comprising:
four switches including a first high side switch, a first low side switch, a second high side switch, and a second low side switch;
a peak current comparator;
a BUCK $T_{off}$ timer;
a BUCK control logic coupled to the BUCK $T_{off}$ timer;
a BOOST $T_{off}$ timer; and
a BOOST control logic coupled to the BOOST $T_{off}$ timer;
wherein the BUCK control logic and the BOOST control logic are configured to:
determine an input voltage (VIN) and an output voltage (VOUT) of the four-switch BUCKBOOST converter;
in an event that VIN is greater than a first threshold voltage, enable a BUCK mode for the four-switch BUCKBOOST converter;
in an event that VIN is lower than a second threshold voltage, enable a BOOST mode for the four-switch BUCKBOOST converter; and
in an event that VIN is between the second threshold voltage and the first threshold voltage, enable a BUCK-BOOST mode for the four-switch BUCKBOOST converter,
wherein the BUCK $T_{off}$ timer comprises a BUCK capacitor and a BUCK comparator while the BOOST $T_{off}$ timer comprises a BOOST capacitor and a BOOST comparator, wherein the BUCK $T_{off}$ timer calculates the off time for the first high side switch and the first low side switch using the following formula:

$$T_{OFFBUCK} = C_{BUCK} \cdot \frac{k1 \cdot (VIN - VOUT) + V_{BIASBUCK}}{k2 \cdot VIN}$$

wherein CBUCK is capacitance of the BUCK capacitor and VBIASBUCK is a bias voltage for the BUCK comparator,
wherein the BOOST $T_{off}$ timer calculates off time for the second high side switch and the second low side switch using the following formula:

$$T_{OFFBUCK} = C_{BOOST} \cdot \frac{k3 \cdot VIN - V_{BIASBOOST}}{k4 \cdot VOUT}$$

wherein CBOOST is capacitance of the BOOST capacitor and $V_{BIASBOOST}$ is a bias voltage for the BOOST comparator,
wherein k1 and k3 are voltage scaling factors while k2 and k4 are voltage to current scaling factors.

18. The system of claim 17, wherein the BUCK $T_{off}$ timer is configured to calculate an off time for the first high side switch and the first low side switch; and the BOOST $T_{off}$ timer is configured to calculate an off time for the second high side switch and the second low side switch.

* * * * *